United States Patent
Henbid et al.

(10) Patent No.: US 10,174,507 B1
(45) Date of Patent: Jan. 8, 2019

(54) SYSTEM FOR ADJUSTING TENSION ON FABRIC PANELS BETWEEN STRUCTURAL MEMBERS

(71) Applicant: Britespan Building Systems Inc., Lucknow (CA)

(72) Inventors: Richard William Henbid, Port Elgin (CA); Robert James Stute, Brussels (CA)

(73) Assignee: BRITESPAN BUILDING SYSTEMS INC., Lucknow (CA)

( * ) Notice: Subject to any disclaimer, the term of this patent is extended or adjusted under 35 U.S.C. 154(b) by 0 days.

(21) Appl. No.: 15/721,043

(22) Filed: Sep. 29, 2017

(51) Int. Cl.
| | |
|---|---|
| E04F 13/00 | (2006.01) |
| E04B 1/343 | (2006.01) |
| E04B 1/41 | (2006.01) |
| E04B 1/24 | (2006.01) |

(52) U.S. Cl.
CPC ........ *E04F 13/005* (2013.01); *E04B 1/34321* (2013.01); *E04B 1/40* (2013.01); *E04B 1/24* (2013.01); *E04B 2001/2481* (2013.01)

(58) Field of Classification Search
CPC .. E04F 13/005; E04B 1/24; E04B 1/40; E04B 1/34321; E04B 2001/2481
USPC ....... 52/222, 698, 656.9; 135/121, 123, 119, 135/907
See application file for complete search history.

(56) References Cited

U.S. PATENT DOCUMENTS

| | | | | |
|---|---|---|---|---|
| 2,950,727 | A * | 8/1960 | Dunn ...................... | E04F 10/02 135/119 |
| 3,699,987 | A * | 10/1972 | Huddle ..................... | E04B 7/14 135/117 |
| 4,192,112 | A * | 3/1980 | Reilly, Sr. ............... | E04F 10/02 160/46 |
| 4,817,655 | A * | 4/1989 | Brooks ................... | E04H 15/58 135/119 |
| 5,333,425 | A * | 8/1994 | Nickerson ............... | E04H 15/18 160/383 |
| 5,823,704 | A * | 10/1998 | Koch ..................... | E04H 15/642 403/391 |
| 6,904,720 | B1 * | 6/2005 | Adolfson .............. | E04F 13/002 160/368.1 |
| 7,849,639 | B2 * | 12/2010 | Sprung ..................... | E04C 3/40 135/124 |
| 8,925,279 | B2 * | 1/2015 | Pantelides ............... | E01D 19/16 52/223.1 |
| 9,038,349 | B2 * | 5/2015 | Fox ....................... | E04H 15/322 52/712 |

(Continued)

FOREIGN PATENT DOCUMENTS

DE          3243525 A1 *  5/1984  ............. E04B 7/105

*Primary Examiner* — Brent W Herring
(74) *Attorney, Agent, or Firm* — Aaron Edgar

(57) ABSTRACT

A system for adjusting tension on fabric panels between two structural members of a fabric panel structure is disclosed. The system includes a rib that extends outwards from the structural members, a first keder rail located adjacent to the rib, a second keder rail located opposite to the rib of the first keder rail, and a fastener that passes through apertures in the first keder rail, the rib, and second keder rail to secure the keder rails against the rib. Preferably, the fastener is adjustable to allow the keder rails to be opened and closed to assist with installing or replacing fabric panels. Alternate embodiments can secure one of the keder rails directly to the structural member without the use of the rib.

18 Claims, 8 Drawing Sheets

(56) References Cited

U.S. PATENT DOCUMENTS

| | | | |
|---|---|---|---|
| 9,091,054 B2* | 7/2015 | Greiner | E04B 9/306 |
| 9,334,644 B2* | 5/2016 | Harnois | E04H 15/644 |
| 9,334,653 B2* | 5/2016 | Fox | E04H 15/322 |
| 2011/0197540 A1* | 8/2011 | Pantelides | E01D 19/16 52/698 |
| 2013/0099185 A1* | 4/2013 | Rountree | E04H 15/322 254/231 |
| 2015/0020473 A1* | 1/2015 | Fox | E04H 15/322 52/712 |
| 2015/0252567 A1* | 9/2015 | Fox | E04H 15/322 52/712 |
| 2016/0230391 A1* | 8/2016 | Fox | E04H 15/642 |

* cited by examiner

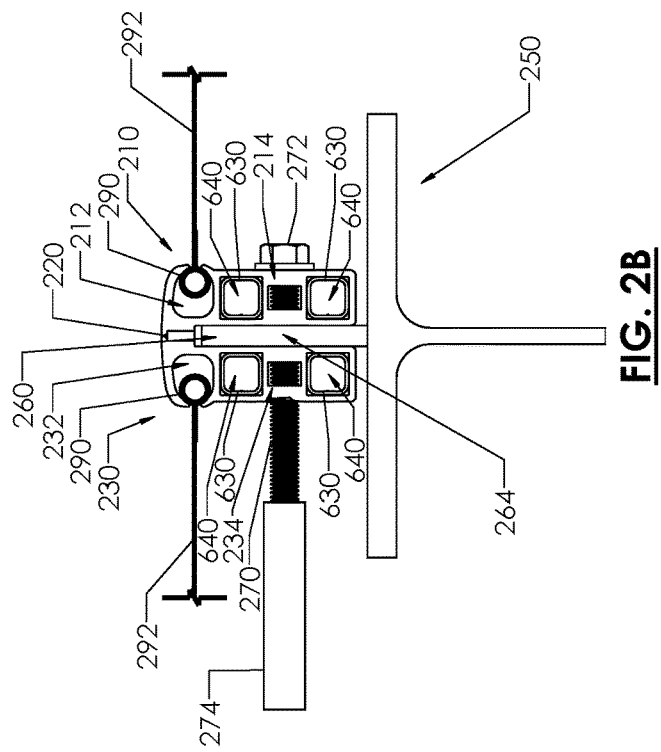
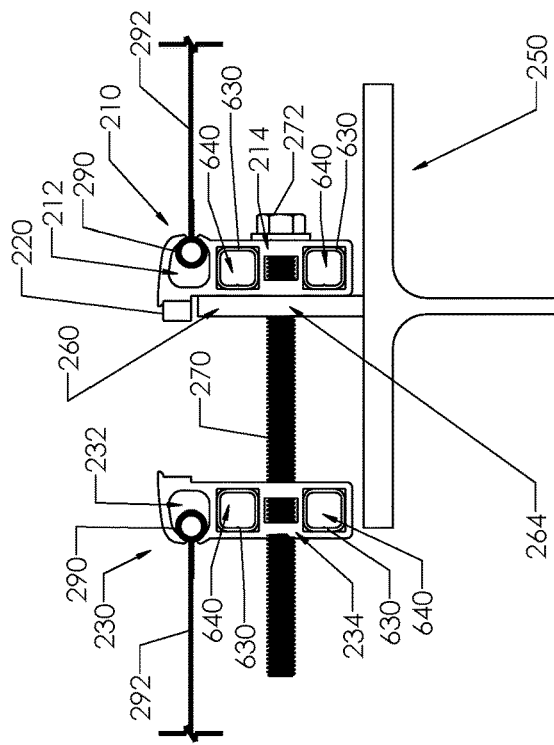

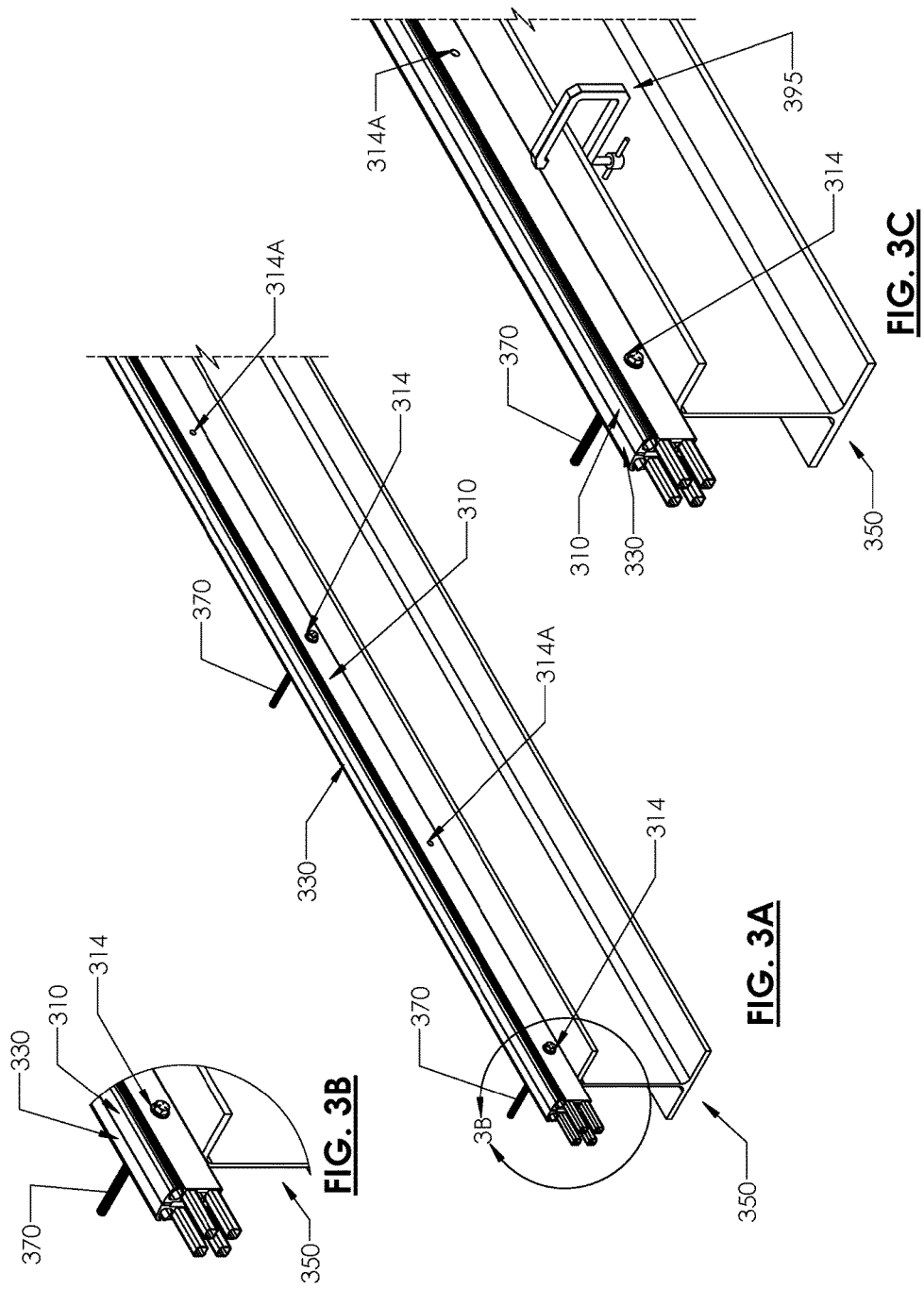

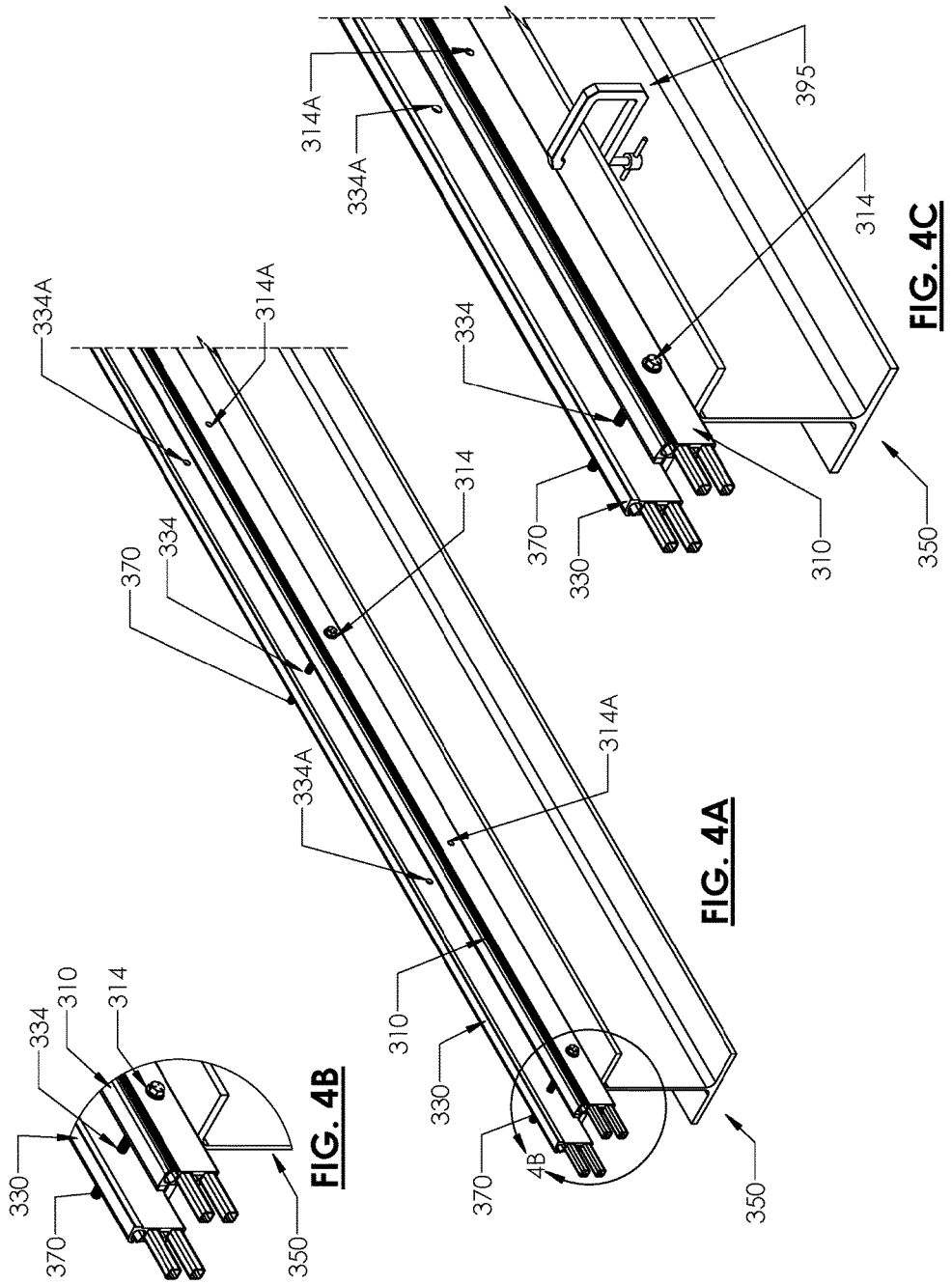

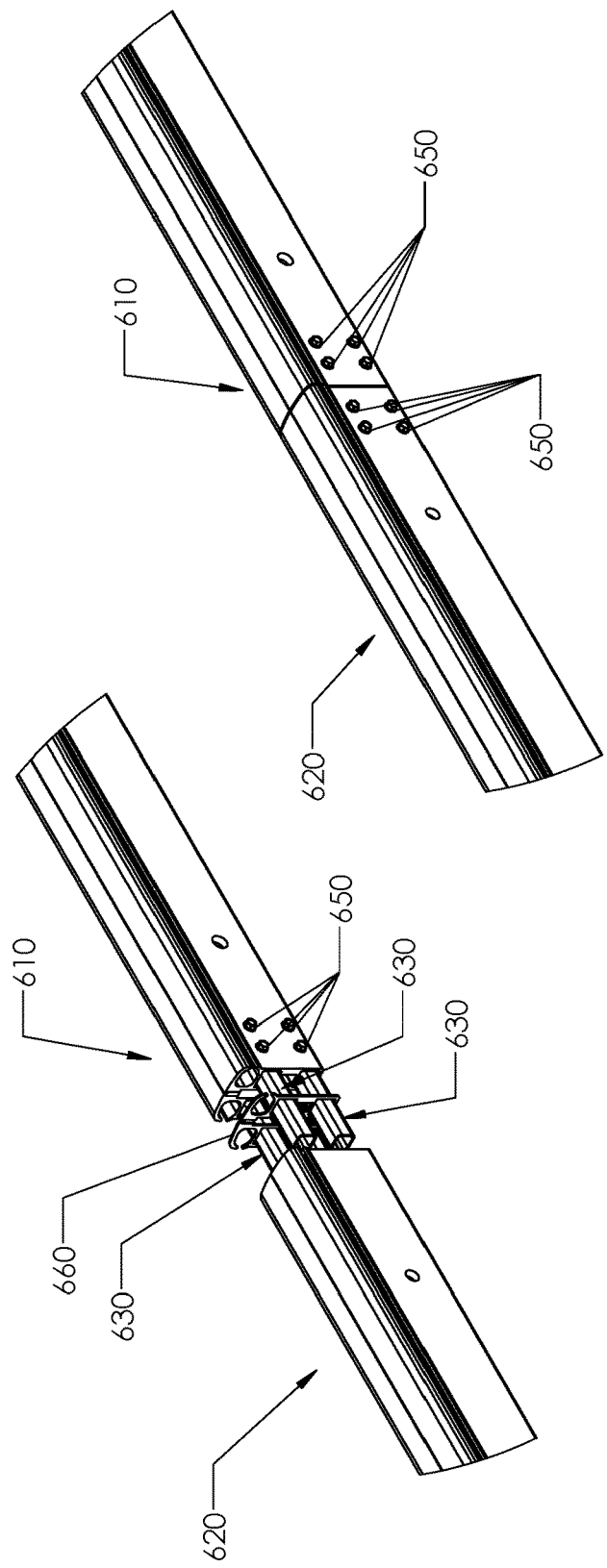

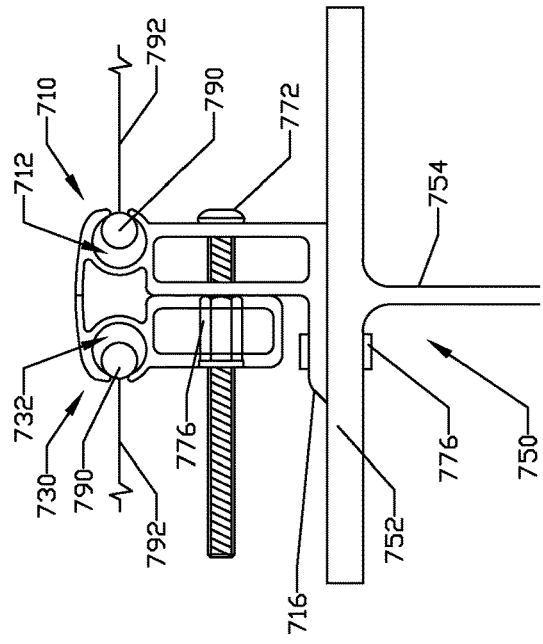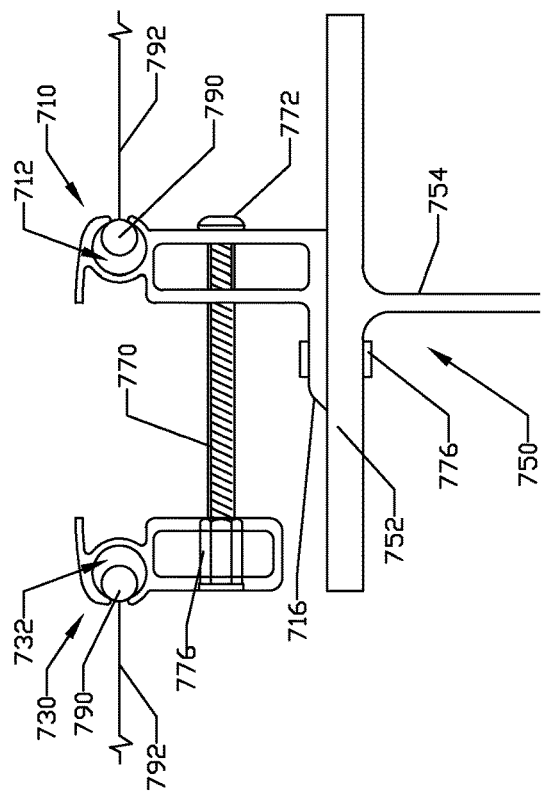

SYSTEM FOR ADJUSTING TENSION ON FABRIC PANELS BETWEEN STRUCTURAL MEMBERS

FIELD

The present disclosure relates generally to buildings that have a covering made from flexible fabric panels. More particularly, the disclosure relates to an improved keder rail system that allows fabric panels to be easily installed or replaced.

BACKGROUND

Fabric panel buildings are used to rapidly deploy a building and are often used for applications where a building is required quickly or for temporary purposes. Some uses include aviation buildings, storage and warehousing, agricultural buildings, military buildings, and buildings for sports and recreation. Fabric panel buildings have a framework consisting of I-beams, open webbed trusses, or other structural members that are secured to ground supports. The fabric panels are secured between the structural members and tension is applied to the fabric panels to remove wrinkles.

There are a number of approaches that have been used to add or remove tension to the fabric panels, but many of these approaches are not suitable for a number of reasons. Many of these approaches require adjustment from outside the structure which can be difficult, dangerous, expensive, and labor intensive. Other approaches place unnecessary wear and fatigue on the structure or fabric panels.

For example, U.S. Pat. No. 5,333,425 to Nickerson et al. discloses a nut that can be tightened to draw oppositely disposed guides toward the structural beam to add tension to the fabric membrane. This approach is extremely labor intensive as it can only be adjusted from outside the structure using hand tools and requires the removal of a weatherproofing cover to ensure the structure is waterproof. This approaches also requires an expensive custom I-beam structure to which a custom keder rail structure must be mated.

U.S. Patent Application No. 2014/0209258 to Wenstrand discloses a fabric tensioning system that can be adjusted from inside the building structure. A nut can be hand tightened to adjust fabric tension, but not enough clearance is provided to allow the use of power tools. An additional weatherproof flap is included but the tension on the weatherproof flap must be adjusted from outside the structure which negates the advantage of having a fabric panel tensioning mechanism adjustable from inside the structure.

U.S. Pat. No. 9,334,653 to Fox discloses a keder rail structure that includes a pair of protrusions that attaches to fabric panels on either side of the structural member. A tensioning tool is used to pull the keder rail into position and the keder rail is then secured in place to the building structure with a bolt that runs through the keder rail and additional clips that attach to the I-beams. This approach of using a tensioning tool is slow and labor intensive. Because a single keder rail structure attaches to both adjacent fabric panels, it is not possible to independently adjust tension on a single fabric panel, which also makes future replacement of a single fabric panel very difficult.

Many other approaches to installing fabric panels to the building structure require placing tension on the structural member of the building. For example, U.S. Pat. No. 4,137,687 to Sprung, U.S. Pat. No. 4,593,710 to Stafford et al., and U.S. Pat. No. 7,849,639 to Sprung all disclose methods of placing tension on the structural members of the building to adjust tension of the fabric panels. These approaches that place stress on the structural elements of the building are not ideal as they potentially damage the structure with unnecessary stress, offer limited tension adjustability once installed, and make replacing a fabric panel difficult and labor intensive. These approaches are also more expensive because they require additional parts and/or custom extrusions of the I-beams to include the spreader or tensioning elements.

SUMMARY

According to a first aspect, a system is provided for adjusting tension on fabric panels between two structural members of a fabric panel structure. The system comprises a rib that has an aperture and extends outward from the structural members; a first keder rail that includes an aperture and is located adjacent to the rib; a second keder rail also having an aperture and located opposite to the rib of the first keder rail; and a fastener that passes through the aperture in the first keder rail, the aperture in the rib, and the aperture in the second keder rail that secures the first and second keder rails against the rib. The first and second keder rails typically each have a keder channel for receiving the fabric panels. The keder rails and rib can also include a series of aligned apertures spaced along the length of the keder rails and rib.

The fastener is preferably adjustable to allow the first keder rail and/or second keder rail to translate away and towards the rib between an open position and a closed position to adjust tension on the fabric panel attached to the corresponding keder rail. The fastener can be a bolt and can be used with a nut to secure the keder rails. In some aspects, the second keder rail can have a seat to receive the nut and prevent rotation. Alternatively, in place of the nut, the aperture in the second keder rail can be threaded to engage the bolt. Preferably, the apertures are positioned to provide clearance between the keder channel and structural member to allow the fastener to be adjusted from within the fabric panel structure, such through the use of a socket to engage the fastener, for example. In some aspects, a protective sleeve can be used to cover a portion of the fastener that extends through the second keder rail to protect the fabric panel from abrasion wear from the fastener.

In some aspects, the system can include a gasket to provide a weatherproof seal between the first keder rail and the second keder rail. Preferably, the gasket is comprised of a resilient material that can compress and expand as the keder rails are opened and closed. The gasket can be attached to an upper portion of one or both of the keder rails that extends past the rib.

The system can be used with a variety of structural member such as an I-beam or structural members having a tubular, rectangular, or square cross-section. The rib can be attached to the structural member by welding or fasteners, and can also be integrally formed with the structural member.

In some aspects, the system can have a locking members that are inserted into locking apertures at the ends of a first set of keder rails and the ends of a second set of keder rails to secure the abutting ends of the first and second set of keder rails. A fastener can be used to secure the locking members to each of the first and second set of keder rails, such a screw or other fastener that extends through the sidewall of the keder rail to engage the corresponding locking member.

According to a second aspect, a system is provided for adjusting tension on fabric panels between two structural members of a fabric panel structure that does not include the rib of the first aspect and instead secures one of the keder rails to the structural member. The second aspect comprises a first keder rail that is fixedly attached to the structural member, a second keder rail positioned adjacent to the first keder rail, and a fastener that passes through an aperture in the first keder rail and an aperture in the second keder rail to secure the second keder rail to the first keder rail.

The system of claim 18 wherein the fastener is adjustable to allow the second keder rail to translate away and towards the first keder rail between an open position and a closed position to adjust tension on the fabric panel attached to the second keder rail. Many of the above aspects related to the embodiments that include a rib can also be applied to the embodiments that attach the keder rail directly to the structural member without the use of a rib.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which:

FIG. 2A is an end view of a first and second keder rails in an open position;

FIG. 2B an end view of the first and second keder rails of FIG. 2A in a closed position;

FIG. 3A is a top perspective view of a first and second keder rails mounted to an I-beam in a closed position;

FIG. 3B is an enlarged view of the ends of the first and second keder rails of FIG. 3A;

FIG. 3C is a top perspective view of the first and second keder rails of FIG. 3A illustrating the use of a clamp to maintain the first keder rail against the rib;

FIG. 4A is a top perspective view of a first and second keder rails of FIG. 3A in an open position;

FIG. 4B is an enlarged view of the ends of the first and second keder rails of FIG. 4A;

FIG. 4C is a top perspective view of the first and second keder rails of FIG. 4A illustrating the use of a clamp to maintain the first keder rail against the rib;

FIG. 6A is a perspective view illustrating connecting a first set of keder rails to a second set of keder rails using locking members and a gasket;

FIG. 6B is a perspective view of the first set of keder rails locked to the second set of keder rails of FIG. 6A;

FIG. 7A is an end view of a first keder rail and a second keder rail in a closed position where the first keder rail is fixedly attached to a structural member; and FIG. 7B is an end view of the first and second keder rails of FIG. 7A in an open position;

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
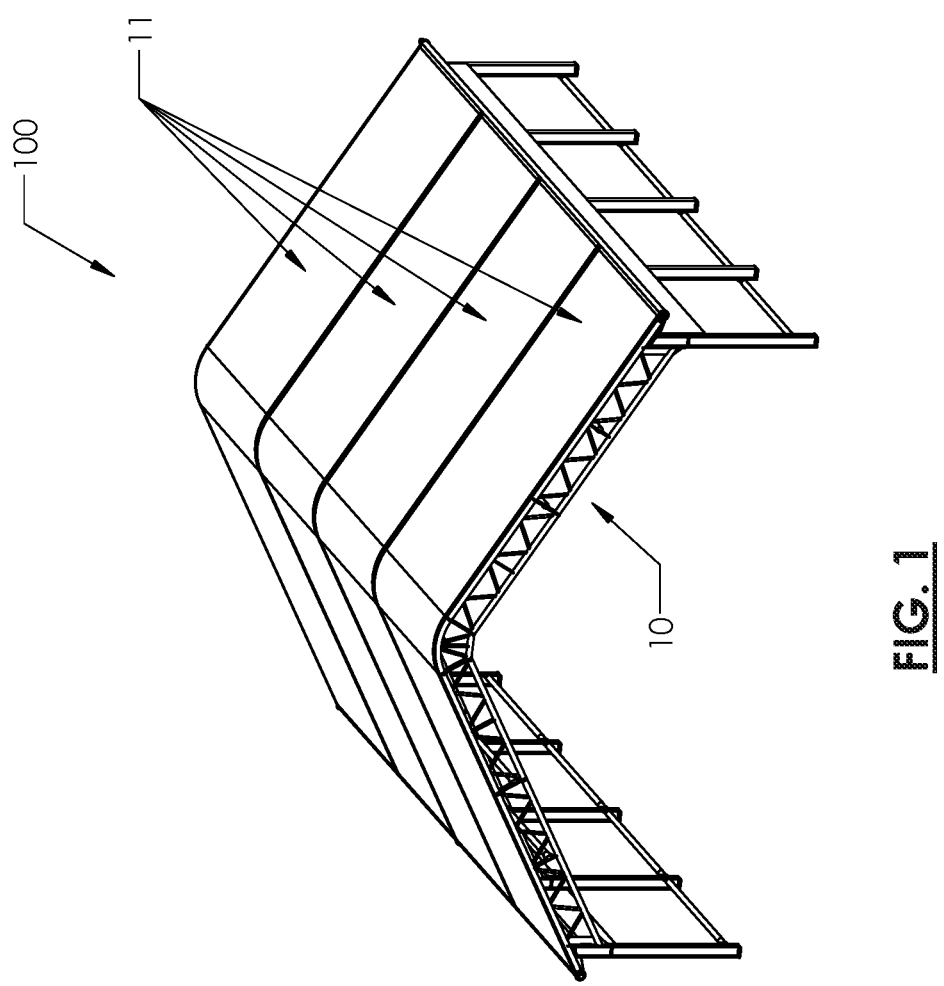
FIG. 1 is a perspective view of a fabric panel structure illustrating the general configuration of a fabric panel structure.

Reference is first made to FIG. 1, shown is a perspective view of a fabric panel structure 100 having a number of structural members shown generally at 10 that extend in an arch-like fashion from one side of the structure to the other side of the structure. Fabric panel sections 11 are sized to fit between structural members 10 and tension is applied to fabric panel sections 11 to remove wrinkles in the fabric and provide rigidity. Replacement of a fabric panel section 11 can be difficult as it requires releasing tension on the fabric panel section 11 prior to removal of the fabric panel section 11, and then after installing a replacement fabric panel section, tension must be reapplied to the replacement fabric panel section. The embodiments disclosed herein provide for an improved system for installing fabric panels 11 and adjusting tension on fabric panels 11 between structural members that allows for a simpler and more cost-efficient way to install and replace fabric panel sections.

Reference is next made to FIGS. 2A and 2B, shown is an end view of a first keder rail 210 and a second keder rail 230 attached to a structural member 250 in an open position in FIG. 2A and a closed position in FIG. 2B. A rib 260 is attached to structural member 250 and extends outwardly with respect to fabric panel structure 100. A fastener 270 is used to attach first keder rail 210 and second keder rail 230 to rib 260. Preferably, first keder rail 210, second keder rail 230, and rib 260 each define apertures that align to receive fastener 270, and for fastener 270 to secure first and second keder rails 210, 230 against rib 260.

The term "keder" generally refers to the system used to attach fabric panels 11 to fabric panel structure 100. Keder comprises a core 290 and a fabric portion 292 that is attached to core 290. Fabric portion 292 can be wrapped around core 290 or otherwise welded or attached to core 290. Core 290 is used to attach fabric panels 11 to structural members 250 by sliding into a keder channel 212, 232 in first and second keder rails 210, 230, respectively. Keder channels 212, 232 provide a channel to accept core 290 with a narrower opening to retain core 290 and allow fabric portion 292 to extend outwards. With traditional prior art fabric panel installation, keder rails must be positioned to allow fabric panels to be installed and then tension must be created on the fabric panel 11 to retain it between keder channels. Keder rails have a consistent cross-section and are preferably constructed using an extrusion process, preferably using aluminium.

Fastener 270 can include bolts, rivets, pins and other known fastener types. In preferred embodiments, fastener 270 is adjustable to allow keder rails 210, 230 to translate away or towards rib 260. For example, in the open position illustrated in FIG. 2A, second keder rail 230 is shown moved away from rib 260 which would release tension on (or "detension") corresponding attached fabric portion 292 to allow for easier installation or removal of core 290 from keder channel 232. After core 290 is secured within keder channel 232 of second keder rail 230, fastener 270 can be adjusted to move first and second keder rails 210, 230 against rib 260 in the closed position shown in FIG. 2B. Further examples of tension adjustment to keder rails are provided with respect to FIGS. 3A-C and 4A-C.

Fastener 270 is preferably a bolt or other threaded fastener. Other embodiments can use other types of adjustable fasteners, such as a ratchet-type fasteners, for example.

The length of an adjustable fastener 270 can be selected based on the detensioning requirements. For example, a longer fastener allows for greater range of movement of first and second keder rails 210, 230. Preferably, the length of fastener 270 should be selected to allow sufficient detensioning of fabric panels 11 in cold weather based on the thermal contraction properties of fabric panels 11. In some embodiments, a protective sleeve 274 can be placed on the end of fastener 270 to protect fabric portion 292 from damage due to contact with fastener 270. Protective sleeve 274 can be comprised of neoprene, plastic, rubber, or other material that will not damage fabric panels 11 from abrasion against fastener 270.

In the embodiment illustrated in FIGS. 2A and 2B, fastener 270 is a bolt having a head 272 that abuts first keder rail 210. Head 272 can be any known shape to receive a tool (e.g. hexagonal, Torx, Allen). Fastener 270 passes through an aperture 214 in first keder rail 210 and an aperture 264 in rib 260 to threadingly engage second keder rail by an aperture 234 that can be threaded. In other embodiments, rather than having a threaded aperture 234, aperture 234 can be a passthrough and a nut can be used to secure second keder rail 230 on fastener 270 (see FIGS. 7A-B as one example). Using a nut and bolt is less preferable as it would require both nut and bolt head 272 to be engaged concurrently to tighten or loosen fastener 270.

Preferable to a simple nut and bolt, either first or second keder rails 210, 230 can define a seat (not shown) for engaging either the head 272 of the bolt or the nut to prevent rotation and allow adjustment of fastener 270. For example, the seat can be hexagonally shaped to receive a hexagonal nut to prevent rotation of the nut. Alternatively, the nut can be welded or otherwise secured to second keder rail 230, or fastener 270 can be welded or otherwise secured to first keder rail 210. It is more preferable for the nut to be secured or seated to prevent rotation rather than the bolt head. This allows bolt head 272 to be adjusted using an impact wrench or socket wrench (rather than an open-end wrench to adjust the nut).

In preferred embodiments, apertures 214, 264, and 234 are positioned to provide clearance between keder channel 212 and structural member 250 to allow a socket to engage bolt head 272 of fastener 270. An advantage of the embodiment illustrated in FIGS. 2A-B over prior art approaches is that a power tool can be used from within the fabric panel structure 100 to quickly and easily adjust tension on fabric panels 11. This approach is preferable to the prior art approaches that require tension adjustment performed from outside the structure which is dangerous and more labor intensive. This approach is also preferable to the prior art approaches that require squeezing adjacent structural member together to detension fabric panels which is extremely labor intensive and puts potentially damaging stress on structural members.

One or more gaskets can be used to provide a weatherproof seal between first and second keder rails 210, 230. In the embodiment illustrated in FIGS. 2A and 2B, a resilient gasket 220 is provided on an upper portion of the first keder rail 210 that extends above rib 260 such that gasket 220 is compressed against a corresponding upper portion of second keder rail 230 in the closed position illustrated in FIG. 2B. It is preferable to have gasket 220 attached to one or both of first and second keder rails 210, 230 so as to not require an additional part which an installer may forget. Gasket 220 can be comprised of a resilient material to allow keder rails 210, 230 to be open and closed without affecting the weatherproof seal provided by gasket 220. For example, gasket 220 can be composed of a resilient foam or rubber.

Alternate gasket arrangements can be used to provide weatherproofing. For example, a gasket can be placed between the interface of the first keder rail 210 and rib 260 and another gasket can be placed between the interface of the second keder rail 230 and rib 260.

Reference is next made to FIGS. 3A-C and 4A-C, shown is a top perspective view of a first and second keder rails 310, 330 mounted to an I-beam 350 in a closed position in FIGS. 3A-C and in an open position in FIGS. 4A-C. Similar reference numerals to FIGS. 2A-B are used throughout this description to identify similar components to those shown in FIGS. 2A-B (particularly the two least significant digits). Keder rails 310, 330 can vary in length and can include multiple apertures 314, 334 for receiving fasteners 370. Preferably, fasteners 370 are spaced apart sufficiently to prevent warping or bending of keder rails 310, 330 from the tension forces of the attached fabric panels. Length of keder rails 310, 330 are preferably selected for ease of manufacturing and transportation to the site of the fabric panel structure.

Keder rails 310, 330 should conform to the shape of structural members 350. For example, structural members 10 of the roof in FIG. 1 are straight with an arced section formed at the peak of the roof. Accordingly, keder rails 310, 330 can conform to this arced shape. In embodiments where the roof has an arch profile with the roof truss structural members having a continual arch, keder rails 310, 330 would have a complementary shape to conform to the roof truss structural members.

Apertures formed in the keder rails can alternate between bolt receiving and bolt engaging apertures. For example, first keder rail 310 has both bolt receiving apertures 314 (e.g. allow the bolt to pass through the aperture) and bolt engaging apertures 314A (e.g. aperture can be threaded to engage the bolt, can include a seat for receiving a nut that engages the bolt, or can have an affixed nut). Apertures 334 and 334A in second keder rail 330 compliment the opposing apertures in first keder rail 310 (e.g. apertures 314, 334 are bolt receiving and bolt engaging, respectively, and apertures 314A, 334A are bolt engaging and bolt receiving, respectively). An installer can select which set of apertures (i.e. between apertures 314 or apertures 314A) to use to select which side of structural member 350 adjustments to fastener 370 are made to adjust tension on attached fabric panels 11.

Distance between apertures 314, 334 should be selected based on strength of keder rails 310, 330 and the load applied from fabric panels 11. For example, higher loads from fabric panels may require closer spacing of apertures 314, 334 along length of keder rails 310, 330 or may also require an installed to use both sets of apertures (i.e. apertures 314, 334 and apertures 314A, 334A).

As shown in FIGS. 3C and 4C, a clamp 395 can be used to fix one of keder rails 310, 334 in position to allow the other keder rail to be adjusted by itself. For example, FIGS. 3C and 4C illustrate clamp 395 attached to the flange of structural member 350 such that clamp 395 abuts against first keder rail 310 to secure it against the rib (obscured, not shown). Preferably, a set of clamps 395 are used along structural member 350 to secure first keder rail 310 against the rib along the length of first keder rail 310. Adjustment to fastener 370 allows second keder rail 330 to be adjusted to detension the attached fabric panel independent of the fabric panel attached to first keder rail 310.

Clamp 395 is shown as a C-clamp as an example of a means to secure first keder rail 310 in position to move the opposing keder rail 330 by itself. Other approaches can use other clamping or securing mechanisms. For example, structural member 350 can include structures on the flange to receive a clamping piece that abuts against a keder rail to prevent movement.

Figure 5A:
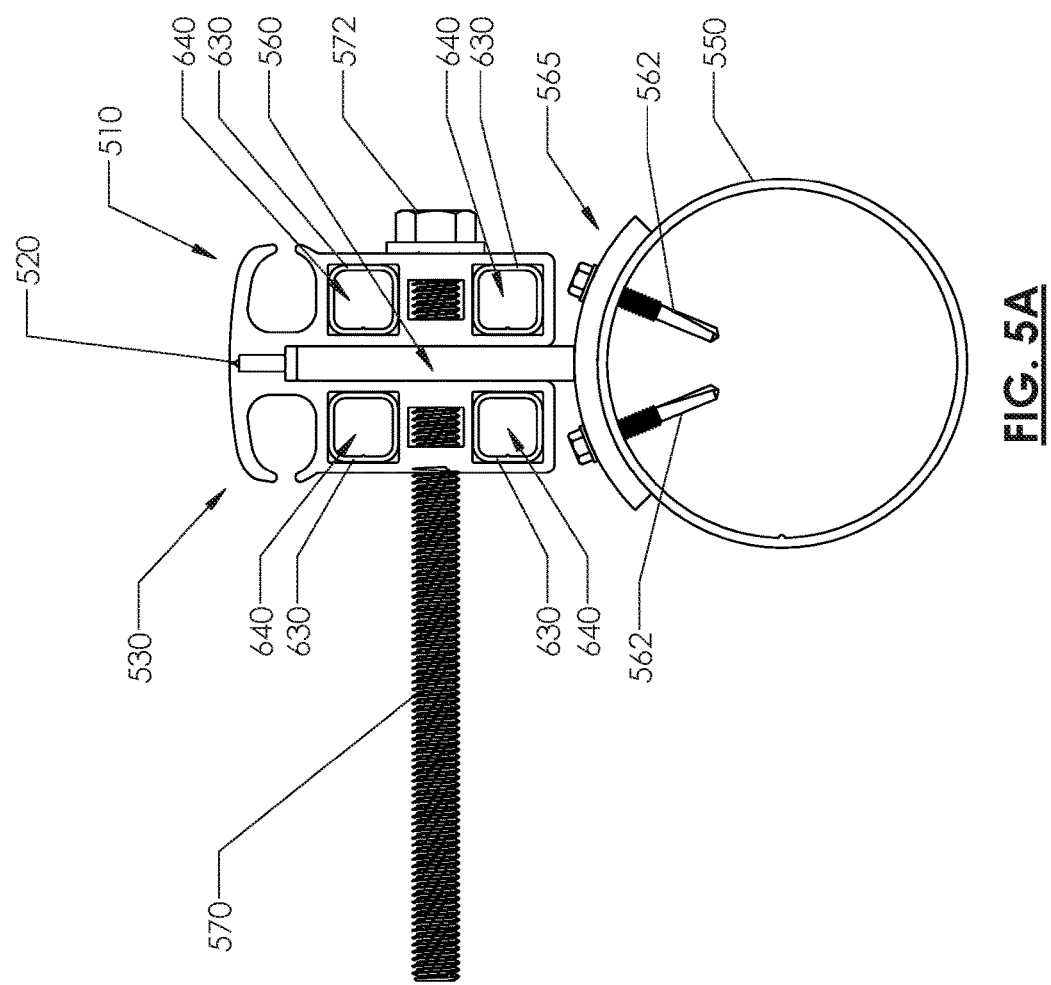
FIG. 5A is an end view of a first and second keder rails in a closed position attached to a tubular frame member.
Figure 5B:
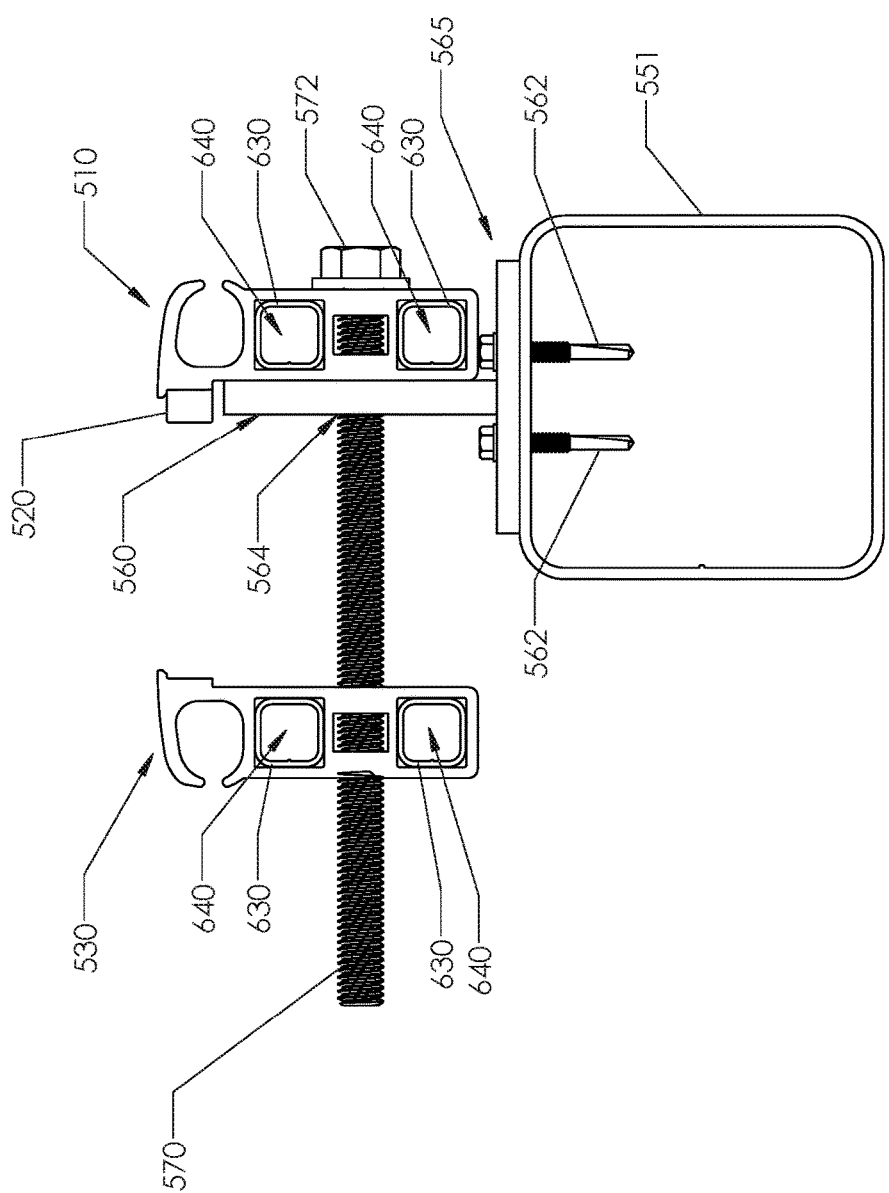
FIG. 5B is an end view of a first and second keder rails in an open position attached to a rectangular cross-section frame member.

Reference is now made to FIGS. 5A-B, shown in an end view of first and second keder rails attached to a rib which is further attached to a tubular frame member 550 in FIG. 5A and rectangular cross-section frame member 551 in FIG. 5B. FIGS. 5A and 5B illustrate that embodiments of the keder rail system disclosed herein are not limited by size or shape of the structural member.

FIGS. 5A and 5B illustrate rib 560 attached to frame member 550, 551 using rib fasteners 562, which can include screws, rivets, or other known fastener types. Rib 560 can include a flange 565 that conforms to the shape of structural member 550. Flange 565 is rounded in FIG. 5A to conform to the tubular structural frame member 550, and flange 565 is flat in FIG. 5B to conform to the flat surface of rectangular structural member 551. Flange 565 can also define apertures to receive rib fasteners 562. It should be noted that the position of aperture 564 in rib 560 and size of first and second keder rails 510, 530 should be designed to provide adequate clearance for fasteners 562. Also, as shown in FIGS. 2A-B, rib 260 can be welded or otherwise integrally formed with structural member 250.

Reference is next made to FIGS. 6A-B, shown is a perspective view illustrating connecting a first set of keder rails 610 to a second set of keder rails 620 using locking members 630. Connecting sets of keder rails together provides for a longer continuous length that can span the entire building structure. Connecting sets of keder rails in this manner allows smaller lengths of keder rails to be manufactured, which is more cost efficient and allows the keder rails to be more easily transported to the building site.

Locking apertures 640 are defined at the ends of keder rails for receiving locking members 630. Locking apertures 640 are best illustrated in end views of keder rail embodiments shown in FIGS. 2A-B and 5A-B. Each keder rail should have at least one locking aperture 640. The illustrated embodiments provide an example where each keder rail includes two locking apertures 640.

In order to secure adjacent sets of keder rails together, a locking member 630 is inserted into a locking aperture 640 defined in each of the first and second keder rails of the first set of keder rails 610. Next, locking members 630 are inserted into corresponding locking apertures 640 in the second set of keder rails 620. Finally, locking members 630 are secured within their corresponding locking apertures 640 in the first and second set of keder rails 610, 620.

Locking members 630 and locking apertures 640 are illustrated with a square cross-section but other shapes can be used. The length of locking members 630, the number of locking members 630, and cross-section size and shape of locking members 630 are all selected to accommodate the loading that may be applied to the keder rails from the tension in the fabric panels and the forces involved in opening/closing the keder rails.

A fastener 650 can be used to secure locking members 630 within the locking apertures 640. As illustrated in FIGS. 6A-B, fastener 650 can be a screw that is fastened through the sidewall of the keder rail extrusion. Other embodiments can use other types of fasteners such as rivets, for example. Locking member 630 and locking apertures 640 can also include an integral securing mechanism, such as a flexible detent and complementary notch, for example, or other known fastening mechanisms.

A gasket 660 can also be used to provide a weatherproof seal when joining the first set of keder rails 610 to the second set of keder rails 620. Gasket 660 is composed of a waterproof material and is compressible between the set of keder rails to form a seal. Gasket 660 can also be in two pieces to allow first and second keder rails to separate to detension fabric panels.

Reference is next made to FIGS. 7A-B, shown is an end view of a first keder rail 710 and a second keder rail 730 where the first keder rail 710 is fixedly attached to a structural member 750 without the use of rib 250 shown in FIGS. 2A-B. A fastener 770 is used to attach first keder rail 710 to second keder rail 730. Fastener 770 is adjustable to allow second keder rails 730 to translate away or towards first keder rail 710. For example, in the open position illustrated in FIG. 7A, second keder rail 730 is shown moved away from first keder rail 710 which would release tension on (or "detension") corresponding attached fabric portion 792 to allow for easier installation or removal of core 790 from keder channel 732. After core 790 is secured within keder channel 732 of second keder rail 730, fastener 770 can be adjusted to move second keder rails 730 against first keder rail 710 in the closed position shown in FIG. 7B. Adjustment can be provided by bolt head 772 or nut 776.

First keder rail 710 can have an attachment flange 716 that provides an area for receiving a fastener 776 to attach first keder rail 710 to structural member 750. As illustrated, attachment flange 716 extends outwards over I-beam flange 752 to allow first keder rail 710 to be positioned near vertical web 754. Fasteners can passthrough attachment flange 716 and I-beam flange 752 to secure first keder rail 710 to structural member 750. Attachment flange 716 also provides increased strength to oppose horizontal tension from attached fabric panels 11.

The embodiment shown in FIGS. 7A-B would require an installer to ensure that each fabric panel is coupled to one moveable keder rail (e.g. second keder rail 730) on one side and a fixed keder rail (e.g. first keder rail 710) on the opposite side of the fabric panel. A fabric panel 11 can only be detensioned by loosening a single fastener 770 on one side of the fabric panel rather than fasteners 270 on each side of fabric panel 11 as is possible in the embodiment of FIGS. 2A-B. This may require fastener 770 to be much longer to provide the equivalent amount of movement of keder rails 210, 230 shown in FIGS. 2A-B.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:
1. A system for adjusting tension on fabric panels between two structural members of a fabric panel structure, the system comprising:
 a rib extending outwardly from at least one of the structural members, the rib defining an aperture, the rib fixedly attached to the structural member;

a first keder rail located adjacent to the rib, the first keder rail defining an aperture;

a second keder rail located opposite to the rib of the first keder rail, the second keder rail defining an aperture;

a fastener that passes through the aperture in the first keder rail, the aperture in the rib, and engages with the aperture in the second keder rail, the aperture of the second keder rail is threaded to engage the fastener, and the fastener secures the first and second keder rails against the rib; and wherein the first and second keder rails each have a keder channel for receiving the fabric panels, the aperture in the first keder rail and the aperture in the second keder rail are each positioned between the keder channel and a bottom portion of the corresponding first and second keder rail adjacent the structural member to provide clearance to allow the fastener to be adjusted from within the fabric panel structure.

2. The system of claim 1 wherein the fastener is adjustable to allow any one of the first keder rail and second keder rail to translate away and towards the rib between an open position and a closed position to adjust tension on the fabric panel attached to the corresponding keder rail.

3. The system of claim 2 wherein the fastener is a bolt.

4. The system of claim 3 wherein the fastener further comprises a nut.

5. The system of claim 4 wherein the second keder rail defines a seat for receiving any one of the nut and a head of the bolt.

6. The system of claim 1 wherein the aperture of the first keder rail is positioned to provide clearance between the keder channel and the structural member to allow a socket to engage a head of the fastener.

7. The system of claim 1 further comprising a gasket to provide a weatherproof seal between the first and second keder rails.

8. The system of claim 7 wherein the gasket is resilient and is attached to an upper portion of any one or more of the first keder rail and the second keder rail, the upper portion extending past the rib.

9. The system of claim 1 wherein the structural member is an I-beam and the rib is attached to the I-beam by any one of fasteners and welding.

10. The system of claim 1 wherein the structural member is an I-beam and the rib is integrally formed with the I-beam.

11. The system of claim 1 wherein the structural member is any one of a tubular frame, a rectangular cross-section frame, and a square cross-section frame, and the rib is attached to the tubular frame by fasteners.

12. The system of claim 1 further comprising at least two locking members, the first keder rail and the second keder rail each having a locking aperture for receiving a corresponding locking member, and the at least two locking members engaging corresponding locking apertures of a second set of first and second keder rails having abutting ends of the first and second keder rails.

13. The system of claim 12 wherein the locking member is attached to the keder rails by a fastener through a sidewall of the corresponding keder rail.

14. The system of claim 1 further comprising a protective sleeve for covering a portion of the fastener that extends through the second keder rail.

15. A system for adjusting tension on fabric panels between two structural members of a fabric panel structure, the system comprising:

a rib extending outwardly from at least one of the structural members, the rib defining an aperture;

a first keder rail located adjacent to the rib, the first keder rail defining an aperture;

a second keder rail located opposite to the rib of the first keder rail, the second keder rail defining an aperture;

a fastener that passes through the aperture in the first keder rail, the aperture in the rib, and engages with the aperture in the second keder rail, the aperture of the second keder rail is threaded to engage the fastener, and the fastener secures the first and second keder rails against the rib, and wherein first keder rail and second keder rail each have a plurality of apertures, the plurality of apertures spaced apart and each of the plurality of apertures alternate between a fastener passthrough aperture and a fastener engaging aperture, and the plurality of apertures complimenting the plurality of apertures in the opposing keder rail opposite the rib.

16. A system for adjusting tension on fabric panels between two structural members of a fabric panel structure, the system comprising:

a first keder rail fixedly attached to a structural member, the first keder rail defining an aperture;

a fastener that passes through the aperture in the first keder rail;

a second keder rail located adjacent to the first keder rail, the second keder rail defining an aperture that threadingly engages the fastener and secures the second keder rail to the first keder rail; and wherein the first and second keder rails each have a keder channel for receiving the fabric panels, the aperture in the first keder rail and the aperture in the second keder rail are each positioned between the keder channel and a bottom portion of the corresponding first and second keder rail adjacent the structural member to provide clearance to allow the fastener to be adjusted from within the fabric panel structure.

17. The system of claim 16 wherein the fastener is adjustable to allow the second keder rail to translate away and towards the first keder rail between an open position and a closed position to adjust tension on the fabric panel attached to the second keder rail.

18. The system of claim 17 wherein the fastener is a bolt.

* * * * *